United States Patent
Quinn

(10) Patent No.: US 6,360,222 B1
(45) Date of Patent: Mar. 19, 2002

(54) METHOD AND SYSTEM THEREOF FOR ORGANIZING AND UPDATING AN INFORMATION DIRECTORY BASED ON RELATIONSHIPS BETWEEN USERS

(75) Inventor: John D. Quinn, San Francisco, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/074,022

(22) Filed: May 6, 1998

(51) Int. Cl.[7] ............................................... G06F 17/30
(52) U.S. Cl. ............................. 707/100; 707/10; 707/4
(58) Field of Search ........................... 40/371; 707/908, 707/9, 10, 1, 200, 201, 101, 100, 4

(56) References Cited

U.S. PATENT DOCUMENTS

| | | | | |
|---|---|---|---|---|
| 5,614,927 A | * | 3/1997 | Gifford et al. | 707/101 |
| 5,706,506 A | * | 1/1998 | Jensen et al. | 707/103 |
| 5,787,442 A | * | 7/1998 | Hacheri et al. | 707/201 |
| 5,802,510 A | * | 9/1998 | Jones | 707/2 |
| 5,819,263 A | * | 10/1998 | Bromley et al. | 707/3 |
| 5,832,506 A | * | 11/1998 | Kuzma | 707/200 |
| 5,878,406 A | * | 3/1999 | Noyes | 706/55 |
| 5,893,118 A | * | 4/1999 | Sonderegger | 707/203 |
| 5,918,227 A | * | 6/1999 | Polnerow et al. | 707/10 |
| 5,940,834 A | * | 8/1999 | Pinard et al. | 707/102 |
| 5,940,843 A | * | 8/1999 | Zucknovich et al. | 707/516 |

* cited by examiner

*Primary Examiner*—Jean R. Homere
*Assistant Examiner*—Greta L. Robinson
(74) *Attorney, Agent, or Firm*—Wagner Murabito & Hao LL

(57) ABSTRACT

A method of and system for organizing entries of an information directory based on relationships or "connections" between the users, and for adding new directory entries to the information directory without intervention by a system administrator. Each connection between entries is created with a "relationship type" describing the connection. According to one embodiment of the present invention, new entries are created by existing users who have existing entries in the information directory. Significantly, an existing user is allowed to access and modify contents of his own directory entry. The existing user may then submit a new user profile to the information directory system to create a new entry for the new user. Further, when an existing user submits the profile for a new user, the information is stored in a relationship list within the existing user's entry. When the existing user's entry is accessed, profile of the existing user and his relationship list will be displayed. In addition, according to one embodiment of the present invention, a new relationship list is created within the new user's directory entry. When the new entry is accessed, the profile of the new user and her relationship list will be displayed. Users can display connections of a specific relationship type.

8 Claims, 10 Drawing Sheets

ADD NEW CONNECTION PAGE

MAKE NEW CONNECTION TO: (INPUT NAME)

E-MAIL ADDRESS: (INPUT E-MAIL ADDRES)

RELATIONSHIP TO NEW USER: (CHOOSE RELATIONSHIP TYPE FROM MENU) — 532

MAKE RELATIONSHIP: ○ PUBLIC  ○ PRIVATE — 533

METHOD AND SYSTEM THEREOF FOR ORGANIZING AND UPDATING AN INFORMATION DIRECTORY BASED ON RELATIONSHIPS BETWEEN USERS

FIELD OF THE INVENTION

The present invention relates to the field of information directories. More specifically, the present invention relates to a computer-based information directory system.

BACKGROUND OF THE INVENTION

Computers are finding new applications as a result of advances in hardware technology and rapid development in software technology and are being used in a wide variety of different applications, such as in finance, commercial transactions, computer-aided design and manufacturing, health-care, telecommunication, education, etc. A computer system's functionality is dramatically enhanced by coupling stand-alone computers together to form a computer network where users may readily exchange files, share information stored on a common database, pool resources, and communicate via electronic mail (e-mail) and via video teleconferencing.

The internet, which is a world-wide network of computers, has gained widespread popularity and use in the past decade. A large segment of the population has access to the internet, and nearly every one of them has an e-mail address to which e-mail messages may be sent. In order to facilitate internet users fully to exploit the usefulness of electronic communication, electronic information directories, which are also known as electronic white pages, are also widely used. These information directories store the telephone numbers, e-mail addresses and other publicly available information in a central storage location and provide public access to these information via the internet or other computer network technologies. Examples of these public information directories may be found at http:\\www.whowhere.com and http:\\www.four11.com. It is believed that such electronic information directories will replace traditional telephone books as the primary source of such information in the near future.

In most of the aforementioned electronic information directories, entries are arranged in a hierarchical treelike structure that reflects political, geographic, and/or organizational boundaries. Prior art FIG. 1 illustrates an example of such a hierarchical tree 10. As shown, entries within the information directory or "tree" 10 are organized according to their attributes such as "country," "state," "telephone area code," "city," and "name." Because the entries are organized hierarchically, computer search engines do not have to go through each and every record in the information directory to retrieve the desired information. Rather, a large number of entries which do not include the requisite attributes can be ignored during a search.

Although the hierarchical organization model 10 is well suited for its intended purposes, accessing such an information directory can sometimes be difficult. For instance, a search using search criteria that are too broad may yield multiple results. Another disadvantage of information directories based on the hierarchical organization model is that contents of the directory change constantly. People move, change their internet service provider, or change their telephone numbers all the time. Accordingly, much effort has to be expended to bring the information directory current. A system administrator or another data entry professional constantly needs to update the e-mail addresses and telephone numbers supplied by the telephone companies and internet service providers into the directory periodically. Users, on the other hand, normally do not have the capabilities to modify their own entries. A user wishing to change his directory entry must notify the system administrator and wait for the system administrator to make the corrections for him using a manual process.

Another limitation of hierarchical treelike directories is that they do not provide intuitive and natural ways for users to search the entries. In those information directory systems, a user performing a search must input specific information about an entry, such as name and address, in order to locate that particular entry or other attributes about that entry. Oftentimes, however, a user may lack sufficient information to locate the entry. In that situation, the user would not be able to retrieve the desired information.

Therefore, there exists a need for a directory system that allows a user to access directory entries in an intuitive and natural manner, and a directory system that does not require maintenance and updates by a system administrator. The present invention is a novel solution to the aforementioned problems with prior art hierarchical tree based information directories.

SUMMARY OF THE PRESENT INVENTION

The present invention provides for a method of and system for organizing entries of a self-propagating information directory based on relationships between the users. Further, the present invention provides for a method of adding new directory entries to the information directory without intervention by a system administrator. According to one embodiment of the present invention, new entries are created by existing users who have existing entries in the information directory. Significantly, an existing user is allowed to access and modify contents of his own directory entry. The existing user may then submit a profile regarding a new user to the information directory system to create a new entry for the new user.

According to one embodiment of the present invention, when an existing user submits the profile of a new user, the information is stored in a relationship list within the existing user's entry. When the existing user's entry is accessed, the profile of the existing user and his relationship list will be displayed. Further, according to one embodiment of the present invention, a new relationship list is created within the new user's directory entry. When the new entry is accessed, the profile of the new user and her relationship list will be displayed.

In furtherance of one embodiment of the present invention, when an existing user submits a new user profile to the information directory system, the existing user may specify a relationship type between the existing user and the new user. The specified relationship type or "connection" is stored in the relationship list within the existing user's entry and is displayed when the existing user's entry is accessed. In one embodiment, the information directory system automatically converts the relationship type specified by the existing user and generates a reciprocal relationship type or reciprocal connection. The reciprocal relationship type is stored in the relationship list within the new user's entry, and is displayed when the new user's entry is accessed. Preferably, the relationship types describe an actual relationship between the existing user and the new user, such as employer-employee or husband-wife. According to one embodiment, the number of different relationship types is predetermined, and users are required to select the appropriate relationship type from a menu. Once created, a "connection" may be deleted by its creator.

In one embodiment of the present invention, relationship information stored within a relationship list is accessible by any user of the information directory system. However, in another embodiment, users may designate the relationship information as private. Relationship information designated as private will not be displayed to anyone who accesses the directory entry. Rather, the private relationship information is only accessible by users described in the private relationship information.

In one embodiment of the present invention, new users are notified via an e-mail message when new directory entries have been created. Preferably, the e-mail message includes an URL address of the new entry such that the new entry may be conveniently accessed. In furtherance of the present invention, contents of a user's own directory entry are maintained and controlled by the user himself. In this way, the information directory will be able to provide the most up-to-date information regarding the user to the public.

These and other advantages of the present invention will not doubt be apparent to those ordinary skilled in the art upon reading the following detailed description of the present invention.

BRIEF DESCRIPTION OF THE DRAWINGS

The accompanying drawings, which are incorporated in and form a part of this specification, illustrate embodiments of the present invention and, together with the description, serve to explain the principles of the invention.

Prior art

As illustrated in FIG. 5A, the directory page of John Smith is shown.

As illustrated in FIG. 5B, the directory page of Jane Smith is shown.

FIG. 5D is an exemplary "Add New Connection" page of the information directory system according to one embodiment of the present invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. In other instances, well known methods, procedures, components, and circuits have not been described in detail as to avoid unnecessarily obscuring aspects of the present invention.

Unless specifically stated otherwise as apparent from the following discussions, it is appreciated that throughout the present invention, discussions utilizing terms such as "receiving," "determining," "indicating," "transmitting," "repeating," or the like, refer to the actions and processes of a computer system or similar electronic computing device. The computer system or similar electronic device manipulates and transforms data, represented as physical (electronic) quantities within the computer system's registers and memories, into other data, similarly represented as physical quantities within the computer system memories, into other data similarly represented as physical quantities within the computer system memories, registers, or other such information storage, transmission, or display devices.

I. Computer System Environment of the Present Invention

Figure 1:
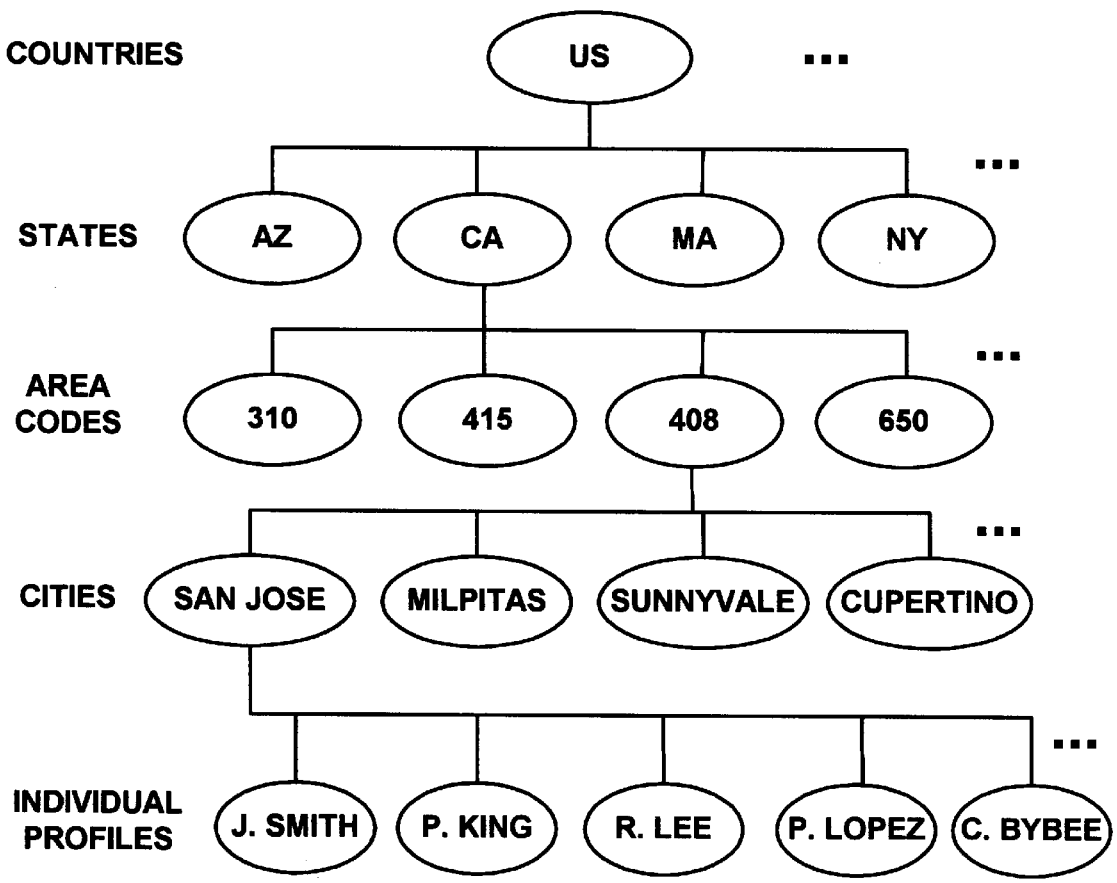
FIG. 1 illustrates a hierarchical treelike structure of a prior art telephone directory.
Figure 2:
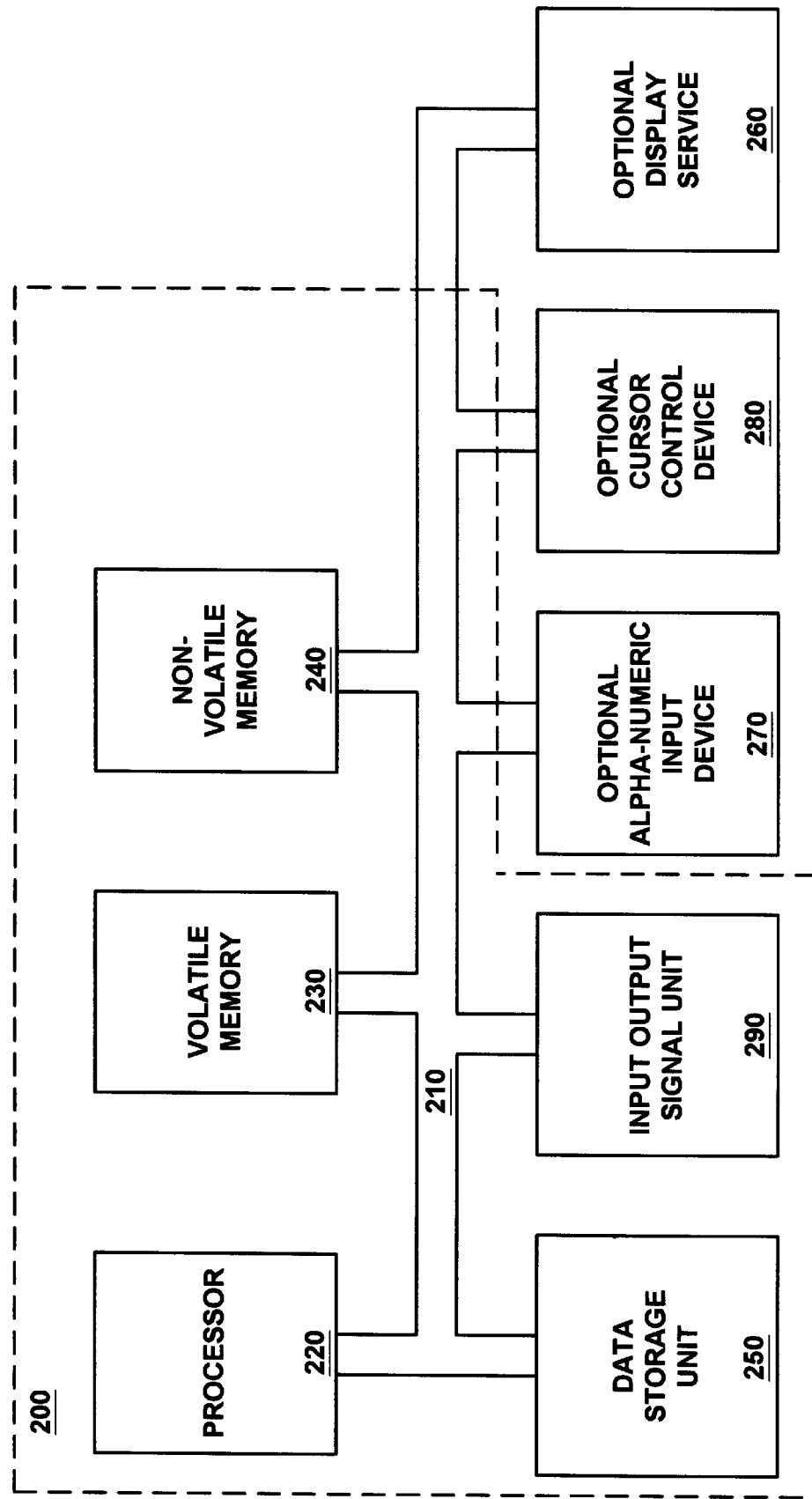
FIG. 2 is a block diagram of an exemplary computer system on which embodiments of the present invention may be practiced.

Portions of the present invention comprise computer-readable and computer-executable instructions which reside in, for example, computer-usable media of a computer system. FIG. 2 illustrates an exemplary computer system 200 upon which one embodiment of the present invention may be practiced. It is appreciated that system 200 of FIG. 2 is exemplary only and that the present invention can operate within a number of different computer systems and/or electronic device platforms.

System 200 of FIG. 2 includes an address/data bus 210 for communicating information and a central processor unit 220 coupled to bus 210 for processing information and instructions. System 200 also includes data storage features such as computer-usable volatile memory 230, e.g. random access memory (RAM), coupled to bus 210 for storing information and instructions for central processor unit 220; computer usable non-volatile memory 240, e.g. read only memory (ROM), coupled to bus 210 for storing static information and instructions for the central processor unit 220; a data storage unit 250 (e.g., a magnetic or optical disk and disk drive) coupled to bus 210 for storing information and instructions; and a network interface unit 290 (e.g. ethernet adapter card, modem, etc.) for receiving data from and transmitting data to a computer network. System 200 also includes optional devices such as an optional alphanumeric input device 270 coupled to bus 210 for communicating information and command selections to central processor unit 220; an optional cursor control device 280 coupled to bus 210 for communicating user input information and command selections to central processor unit 220; and an optional display device 260 coupled to bus 210 for displaying information.

Figure 3:
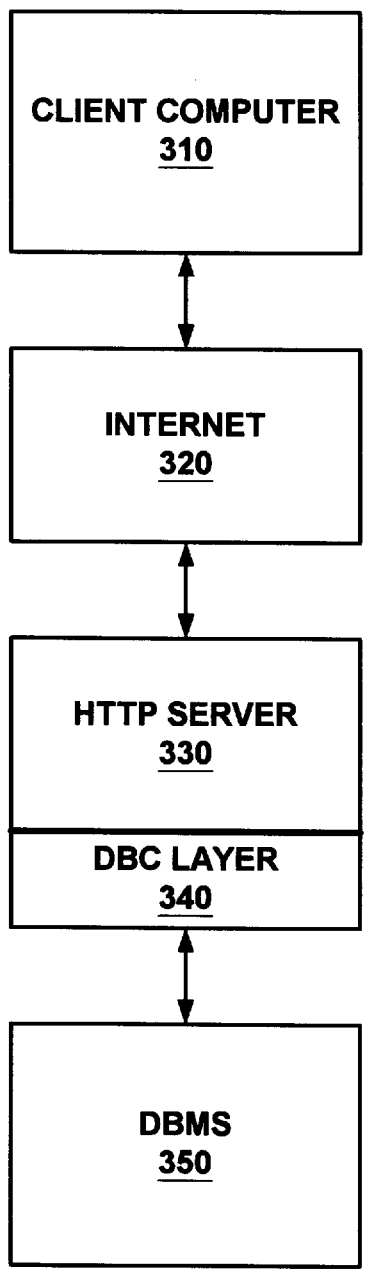
FIG. 3 is a block diagram illustrating an exemplary server/client model in which portions of the present invention may be practiced.

Embodiments of the present invention are drawn to various processes executed on separate computer systems across a computer network such as the Internet. FIG. 3 illustrates a logical block diagram of a client/server model 300 in which processes according to the present invention are executed. As illustrated in FIG. 3, client/server model 300 comprises a client computer 310 coupled to an HTTP (Hypertext Transfer Protocol) server 330 via a computer network 320. HTTP server 330 is coupled to transmit and receive data to and from a database management system (DBMS) 350 via a connectivity layer 340. Client computer 310 may comprise an exemplary computer system 200 running an Internet browser, or other similar software which provides a graphical user interface (GUI) to a user of the present information directory system. Client computer 310 receives input from users, which are then transmitted across the computer network 320, such as the Internet, to HTTP Server 330. HTTP server 330 may also comprise a computer similar to exemplary computer system 200. Functionally, HTTP server 330 stores HTML documents and any associated files, and uses HTTP (Hypertext Transfer Protocol) to serve up these files when requested by client computer 310.

In addition, HTTP Server 330 of FIG. 3 provides an interface between client computer 310 and DBMS 350 via database connectivity (DBC) layer 340 such as JDBC (Java Database Connectivity) or ODBC (Open Database Connectivity). Essentially DBC layer 340 translates high-level commands from client computer 310 to SQL-level commands. DBMS 350, after receiving SQL commands, will fetch the requested data. Data fetched by DBMS 350 will then be transmitted to HTTP server 330 to be converted into HTML formats. In one embodiment of the present invention, the fetched data are subsequently converted into HTML format by software engines of HTTP server 330 and are displayed by client computer 310 as "webpages." For simplicity, a directory entry displayed by client computer 310 in the form of an HTML document is referred to as a directory page in the following description of the present invention. Further, details of the implementation of the software engines for composing HTML documents from templates are well known in the art. Therefore, they are not described herein in detail to avoid obscuring features of the present invention.

II. Structure of the Information Directory of the Present Invention

Figure 4:
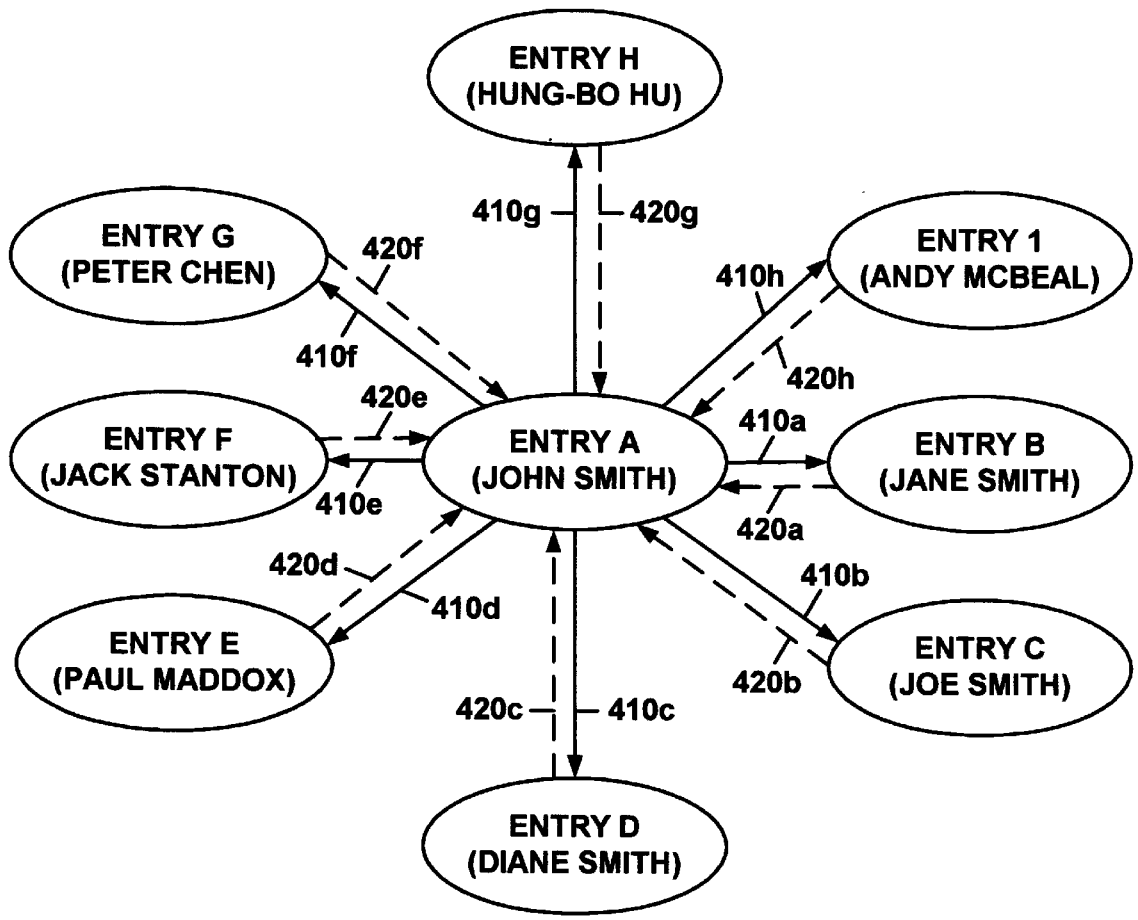
FIG. 4 is an organization map of directory entries illustrating the structure of an information directory according to one embodiment of the present invention.

Referring now to FIG. 4, a relationship graph 400 illustrating the organization of an information directory according to one embodiment of the present invention is shown. Specifically, exemplary information directory 400 includes nine directory entries: entry A through entry I, each corresponding to an individual. Further, each entry includes identity information, such as date of birth, job title, e-mail address, homepage address, etc. It should be noted that the relationship graph 400 does not represent a network of server connections or other network configuration information. Further, exemplary information directory 400 may include a much larger number of entries. Only Entries A–I are shown for simplicity.

Significantly, each entry of the information directory includes a relationship list describing the relationships between the owner of the entry and owners of other entries. Table 1 illustrates an exemplary relationship list of entry A.

TABLE 1

| Entry Name | Relationship Type |
|---|---|
| Jane Smith | Wife |
| Joe Smith | Brother |
| Paul Maddox | Friend |
| Diane Smith | Aunt |

TABLE 1-continued

| Entry Name | Relationship Type |
|---|---|
| Peter Chen | Colleague |
| Hung-bo Hu | Colleague |
| Andy McBeal | Attorney |
| Jack Stanton | Friend |

Particularly, the relationship list illustrated in Table 1 describes the relationships among John Smith and a few other users of the information directory system. A similar relationship list is included in each of the entries B–I. The relationship between the John Smith and the other users may be represented graphically by connections 410*a–h* and reciprocal connections 420*a–h* of relationship graph 400. Particularly, connection 410*a* describes a "wife" relationship type with respect to Entry A, and connection 420*a* describes a "husband" relationship type with respect to Entry B. According to one embodiment of the present invention, each relationship type has a reciprocal or inverse relationship type. For instance, the "wife" relationship type is reciprocal or inverse to the "husband" relationship type 420*a*. For simplicity, only the connections 410*a–h* and reciprocal connections 420*a–h* between Entry A and other entries are illustrated. Connections among entries B–I are not illustrated in order to avoid obscuring aspects of the present invention.

Table 2 illustrates a list of several relationship types or "connections" and their respective reciprocal relationship types or "reciprocal connections."

TABLE 2

| Relationship Type | Reciprocal Relationship Type |
|---|---|
| Attorney | Client |
| Parent | Child |
| Friend | Friend |
| Husband | Wife |
| Buyer | Seller |
| Physician | Patient |
| Roommate | Roommate |
| Employer | Employee |
| Teacher | Student |

According to one embodiment of the present invention, the relationship list of an entry is displayed when the entry is accessed. In this way, the information directory of the present invention provides relationship information among its users in addition to providing identity information of its users. Further, the relationship list may be displayed in HTML format such that the connections are displayed as hyperlinks. Consequently, entries of the related users may be conveniently accessed with browser software.

In one embodiment of the present invention, only the owner (e.g. the creator) of the relationship list may alter its contents. That is, in the above example, John Smith may delete connection 410*a*. However, connection 420*a*, which is owned by Jane Smith, will not be deleted even when connection 410*a* is deleted.

In one embodiment of the present invention, a connection may be designated by its creator as public or private. Public connections or relationship types are displayed when a directory entry is accessed. Private connection or relationship types, on the other hand, are displayed when the directory entry is accessed by the connection's owner(s). Public and private connections or relationships types are further discussed below in Section V.

III. Graphical User Interface of the Present Information Directory System

In one embodiment of the present invention, a graphical user interface (GUI) of the information directory is provided by internet browser software running on client computer 310. In the present embodiment, the internet browser software receives directory information from server computer 330 via computer network 320 and displays the directory information in the form of "webpages." For simplicity, in the following discussion, "webpages" that display directory entries are referred to as "directory pages." FIGS. 5A, 5B and 5C illustrate exemplary directory pages displayed by client computer 310 when the information directory is accessed.

Figure 5A:
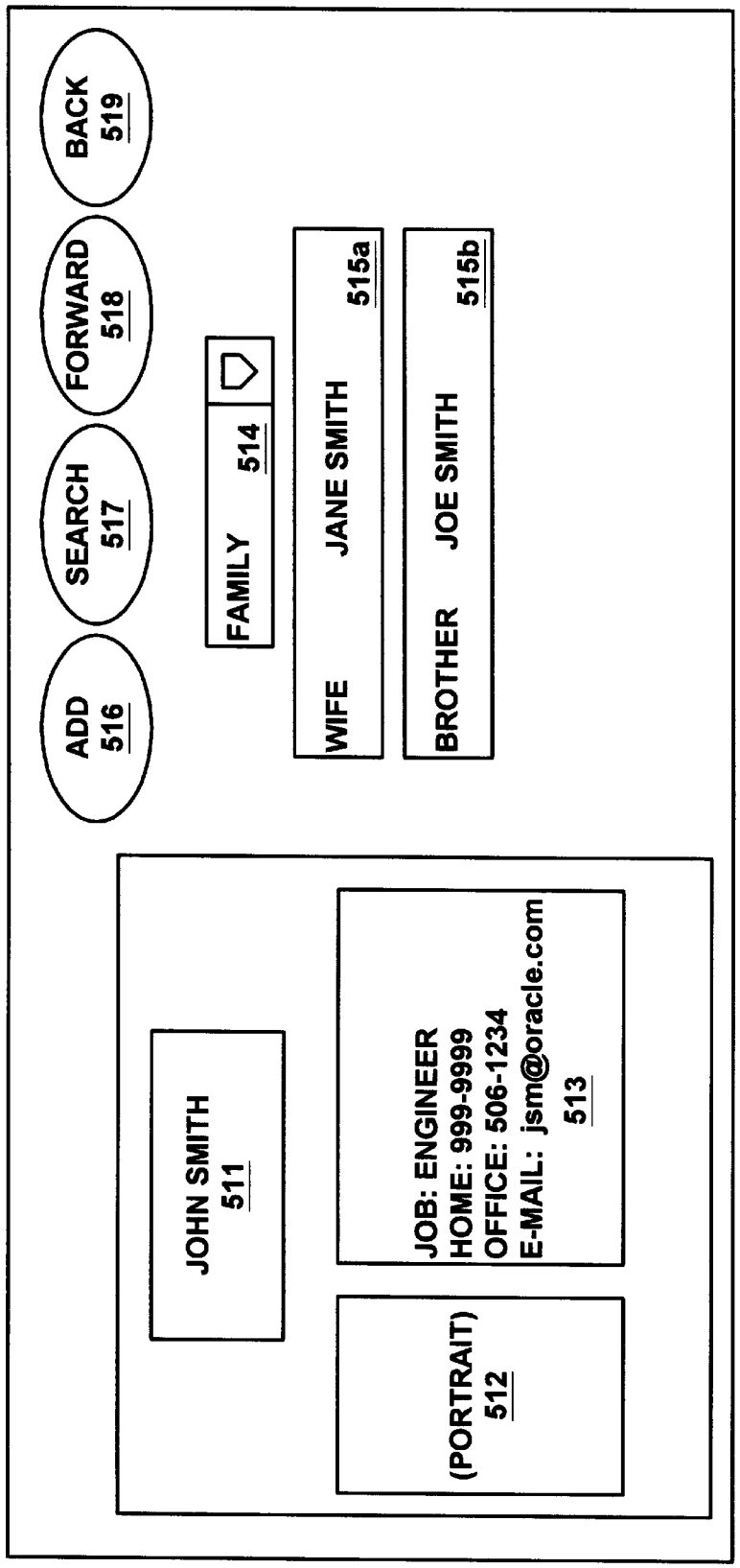
FIG. 5A is an exemplary directory page of the information directory system according to one embodiment of the present invention.
Figure 5B:
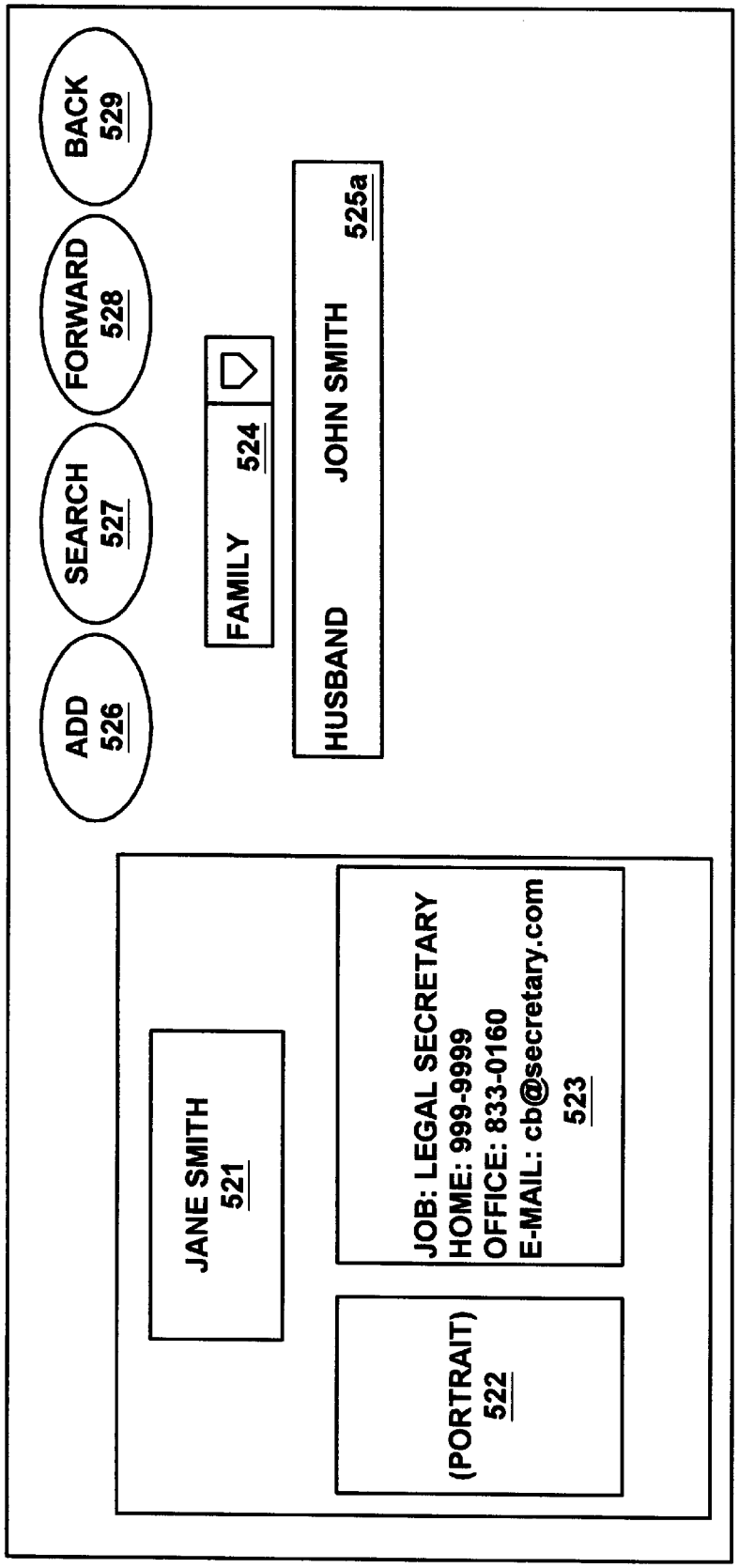
FIG. 5B is an exemplary directory page of the information directory system according to one embodiment of the present invention.
Figure 5C:
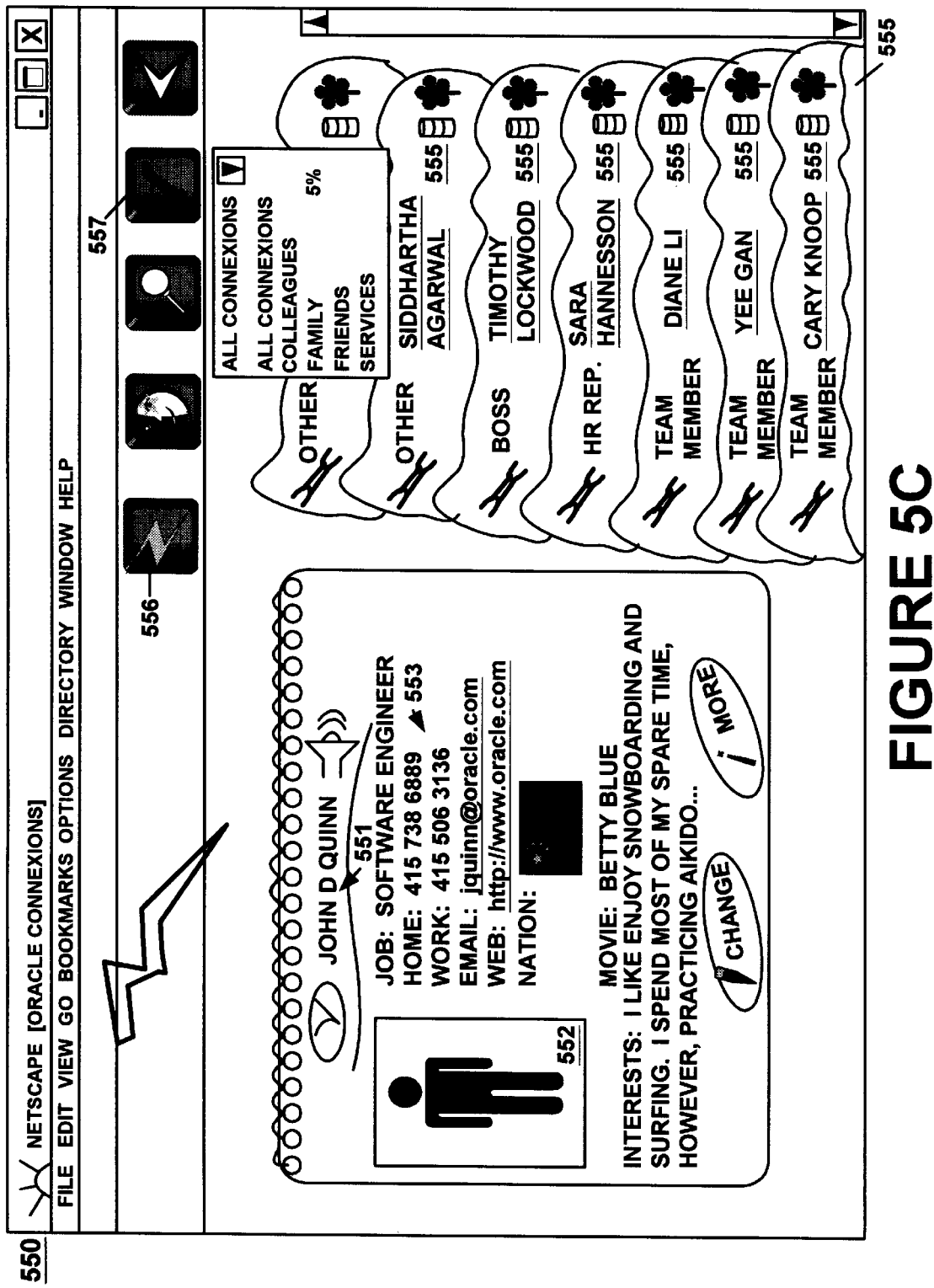
FIG. 5C is an exemplary directory page of the information directory system according to one embodiment of the present invention.

FIG. 5A illustrates a exemplary directory page 510 displaying entry A of FIG. 4. Specifically, directory page 510 includes a plurality of display fields including a name field 511 for displaying the name of the individual represented by the directory entry, a portrait field 512 for displaying a portrait of the owner of the entry, an identity information field 513 for displaying an identity information such as telephone number, e-mail address, etc., of the owner. Significantly, directory page 510 further includes a plurality of links 515a–515b each defined by a relationship type and a name of a related user. In addition, directory page 510 may include an "add" button 516 for providing access to an "Add New Connection" page, a search button 517 for providing access to a "search page," a forward button 518 and a backward button 519 for allowing a user to browse through different pages of the information directory. Directory page 510 further includes a "relationship category selection" pop-up menu 514 for selecting a particular category of relationship types to be displayed. In the particular embodiments as illustrated in FIG. 5A, a "relationship category" of "family" is selected. Accordingly, links 515a–515b only display connections to users who are family members of John Smith.

Significantly, links 515a–515b are generated from the relationship list of the directory entry and provide a interface for a user to access the directory entries of other related users. Particularly, link 515a displays a relationship type "Wife" and a name "Jane Smith." Each of links 515a–515b corresponds to one of connections 410a–410h of FIG. 4. Links 515a–515b may be implemented as hyperlinks. Thus, a user viewing the directory page may be able to access other directory pages by selecting one of the links. For instance, a user viewing the directory page 510 may select link 515a with a cursor control device to access Jane Smith's directory page.

In one embodiment of the present invention, links 515a–515b are implemented with HTML (HyperText Markup Language). Further, with reference to the exemplary computer network of FIG. 3, the information directory may be stored in a remote DBMS 350, and the directory pages may be store statically or dynamically. When stored dynamically, directory pages may be composed "on-the-fly" by HTTP server 330 from the information fetched from DBMS 350 and HTTP templates before they are transmitted to and displayed on client computer 310. Software components for implementing the server/client model 300 and for composing webpages from templates and information fetched from DBMS 350 are well known in the art, and are therefore not discussed herein in detail to avoid obscuring aspects of the present invention.

FIG. 5B illustrates a directory page 520 displaying Entry B of FIG. 4. Similar to directory page 510 of FIG. 5A, directory page 520 includes a plurality of display fields including a name field 521 for displaying the name of the user, a portrait field 522 for displaying a portrait, a identity information field 523 for displaying an identity information, and a link 525a for displaying relationships to another user of the information directory. In addition, directory page 520 may include an "add" button. 526 for providing access to an "add new directory entry page," a search button 527 for providing access to a "search page," a forward button 528, a backward button 529 for allowing a user to browse between the different pages of the information directory, and a relationship category selection pop-up menu 524 for choosing a relationship category to be displayed.

In the particular embodiment shown, link 525a of FIG. 5B displays a relationship type "Husband" and a name "John Smith." This link 525a corresponds to connection 420a of FIG. 4. Thus, a user viewing directory page 520 may access directory page 510 by selecting link 525a. Directory page 520 may include addition links for connecting to other entries.

FIG. 5C illustrates a screen shot of a directory page 550 according to one embodiment of the present invention. Similar to directory pages 510 and 520, directory page 550 includes a plurality of display fields including a name field 551 for displaying the name of the individual represented by the directory entry, a portrait field 552 for displaying a portrait of the owner of the entry, a identity information field 553 for displaying an identity information such as telephone number, e-mail address, etc., of the owner. Significantly, directory page 550 further includes a plurality of links 555 each defined by a relationship type and a name of a related user. In addition, directory page 550 may include an "add" button 556 for providing access to an "Add New Connection" page, and a search button 557 for providing access to a "search page."

Directory page 550 further comprises a "relationship category" pop-up menu 590 for allowing a user to select a particular category of relationship types to be displayed as links. In the particular embodiment as illustrated, relationship types within a "all connections" category is selected by a user. However, if a relationship category "family" is selected, relationship types such as "siblings," "wife," "uncles," etc., will displayed. "Relationship category" pop-up menu 590 may include other categories of relationship types such as "friends," "service providers," and "colleagues."

FIG. 5D illustrates an "Add New Connection" page 530 according to one embodiment of the present invention. In the present embodiment, the "Add New Connection" page 530 is displayed on client computer 310 when the "Add New Connection" button 514 (FIG. 5A) or 524 (FIG. 5B) is selected or when the existing user desires to add a new connection to his relationship list. Preferably, security features, such as encryption and password protection, are implemented to verify that "Add New Connection" page 530 is only accessible by the owner of the directory entry. These security features are well known in the art. Therefore, a person of ordinary skill in the art would be able to implement those features within the present information directory system upon reading the present disclosure.

Particularly, "Add New Connection" page 530 comprises input fields 532 for receiving a new user's e-mail address, name, and information regarding the new user's relationship with the existing user. The fields 532 are initially blank and are to be filled out by an existing user. If the new user is not already registered with the information directory, a new entry will be created. Further, a relationship type between the existing user and the new user and the new user's name will be stored in the relationship list in the existing user's entry. In this way, when the existing user's entry is displayed, the relationship information and the name of the new user will also be displayed.

"Add New Connection" page 530 of FIG. 5D further comprises user selection fields 533 for allowing users to specify a privacy type of the relationship. For example, in one embodiment of the present invention, the user may specify a relationship as "public." If the relationship is specified as "public," the relationship information will be displayed when the directory entry of the user is accessed. However, the user may designate a relationship as "private." In that case, the relationship will be displayed only when the user accesses his own directory page.

Significantly, when information regarding the new user is stored in the existing user's directory entry, the information of the existing user is also stored in the new user's directory entry. In one embodiment, when a new link is created between an existing user and a new user, the existing user's name and e-mail address are stored in the new user's relationship list. Consequently, the name of the existing user will be displayed when the new user's directory entry is accessed.

IV. Searching the Information Directory of the Present Invention

Figure 5E:
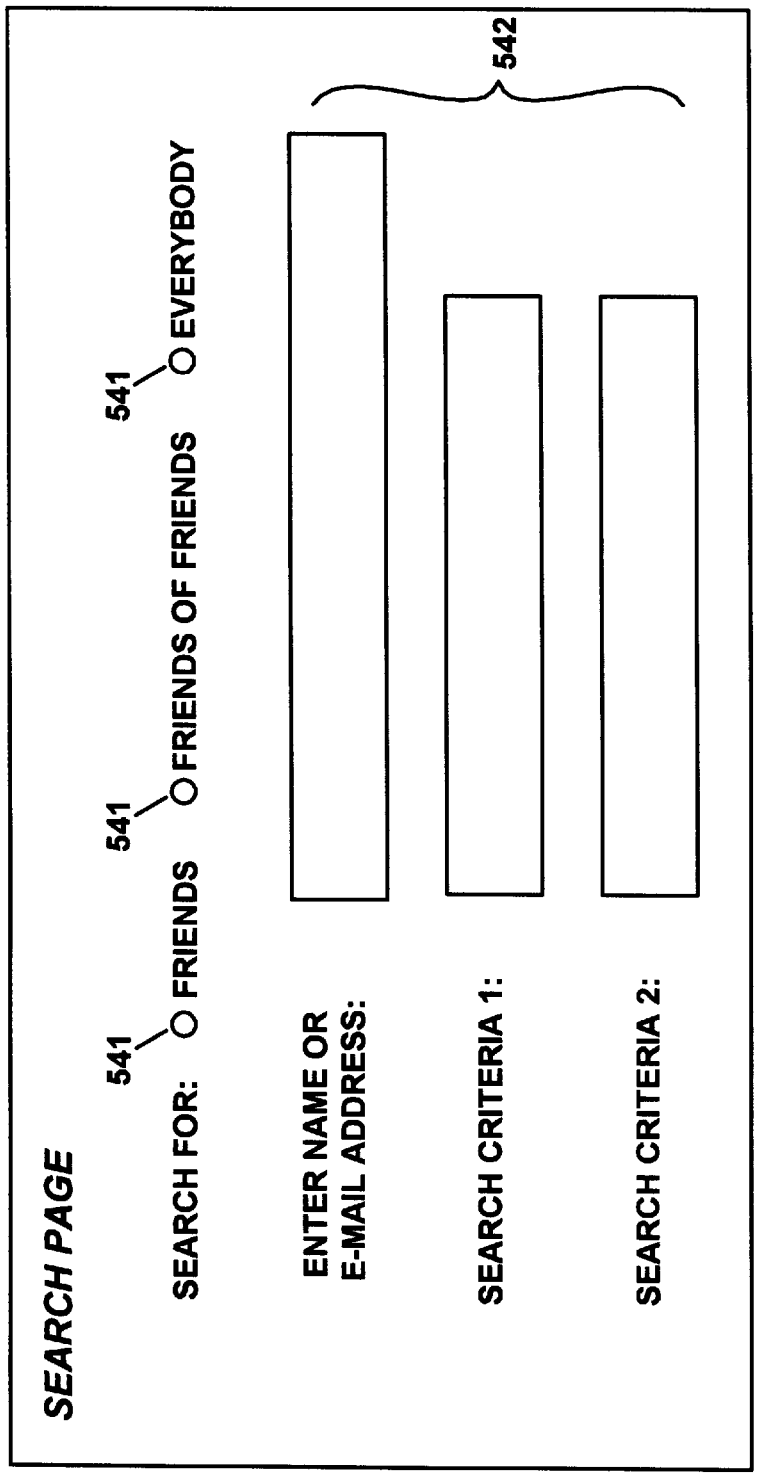
FIG. 5E is an exemplary "search" page of the information directory system according to one embodiment of the present invention.

FIG. 5E illustrates a "Search" page 540 according to one embodiment of the present invention. In the present embodiment, the "Search" page 540 is displayed on client computer 310 when the "Search" button 517 (FIG. 5A) or 527 (FIG. 5B) is selected or when the existing user desires to add a new connection to his relationship list. Preferably, "Search" page 540 is accessible by any users of the information directory system of the present invention.

Particularly, "Search" page 540 comprises selection fields 541 for receiving a search type from the user. According to one embodiment of the present invention, various search types may be performed on the information directory. As illustrated, searches may be performed for other users of the information directory system who are "friends" of the user. In such searches, search engine software components of the present invention will limit the search to the users who are linked to the user via other users. Searches may also be performed on the whole directory system. In that case, search engine software components of the present invention will go through all the records of the information directory system. Search page 540 further comprises search criteria fields 542 for receiving search criteria information such that even narrower searches may be performed. Search engine software are well known in the art. Therefore, it would be apparent a person of ordinary skill in the art, upon reading the present disclosure, that many different implementations of the software search engine may be used to carry out the functions of the present invention.

V. Addition of New Connections and Entries by Existing Users

According to one embodiment of the present invention, an existing user of the present information directory system may choose to add a new connection to another existing user or to add a new directory entry for a new user anytime he is accessing the information directory system. A flow diagram showing the steps of process 600 used for adding a new connection or a new directory entry is illustrated in FIG. 6.

It is appreciated that process 600 may be implemented as program code stored in volatile memory 230 or non-volatile memory 240 of a computer system 200.

Figure 6:
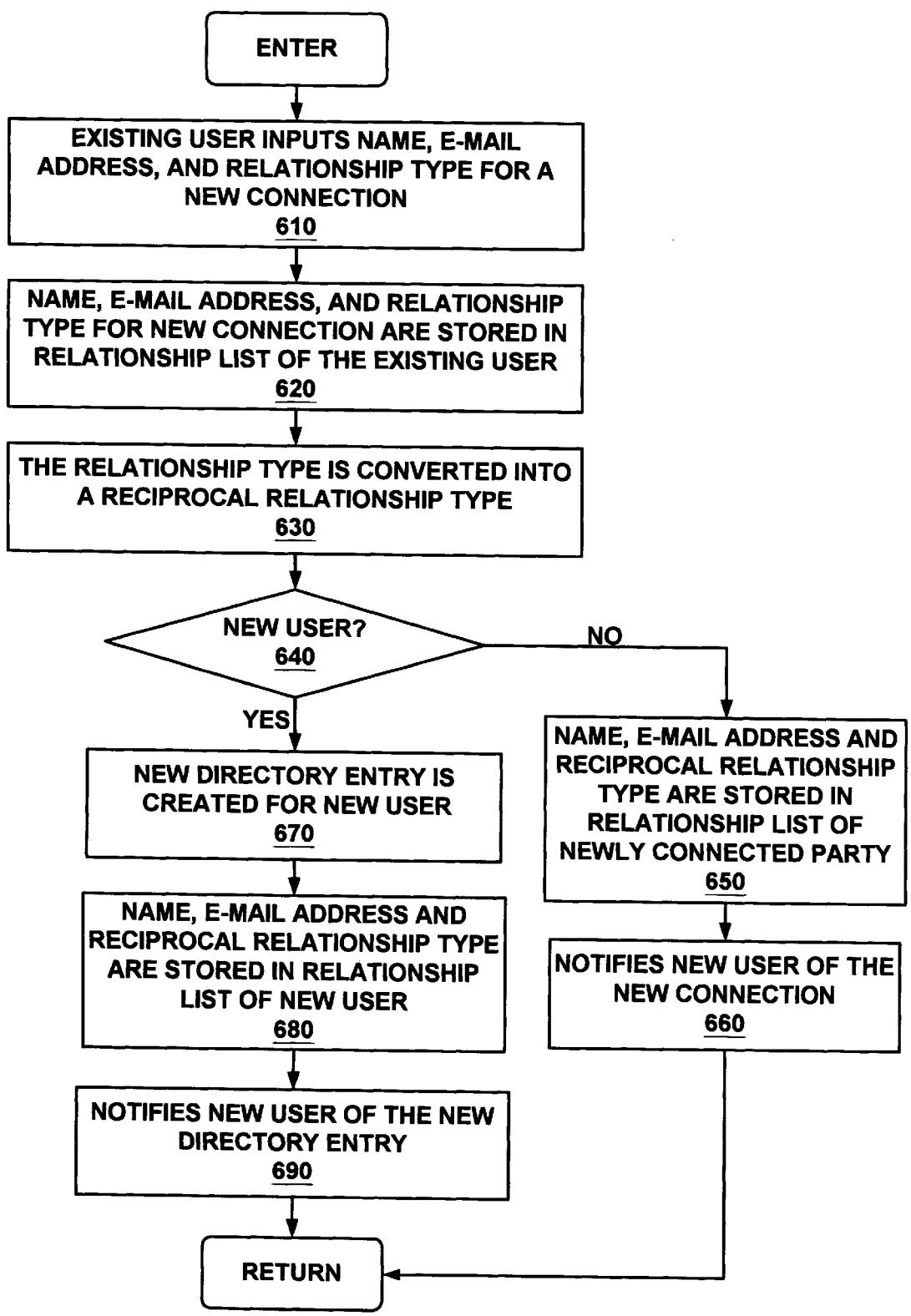
FIG. 6 is a flow diagram illustrating the operations of the information directory system according to one embodiment of the present invention.

Referring to FIG. 6, in step 610, existing user inputs the name, the e-mail address, and a relationship type for a new connection using the "Add New Connection" page 530 of FIG. 5D.

In step 620, the name, the e-mail address, and the relationship type for the new connection are stored in the relationship list of the existing user's directory entry.

In step 630, software components of the present information directory system converts the relationship type into a corresponding reciprocal relationship type. For instance, if a relationship type provided by the existing user is "Wife," then the corresponding reciprocal relationship type will be "Husband." Other examples of relationship types and their corresponding reciprocal relationship types are listed in Table 2 above. A lookup table well known in the art of computer programming may be implemented to perform the conversion and is, therefore, not described here in detail so as to avoid obscuring invention features of the present invention.

In step 640 of FIG. 6, software components of the information directory system performs a search to determine whether a directory entry already exists for the new user. If such a directory entry already exists, then a new directory entry will not be created. Rather, in step 650, the reciprocal relationship type, and the name and e-mail address of the existing user is copied to the relationship list of the newly connected party.

In step 660, an optional e-mail message may be sent to the newly-connected party to notify him that a new connection has been made to his directory entry. The e-mail may also include an identity of the existing user who created the new connection. Thereafter, the process ends. The user may continue to add other new connections, or the user may view the directory entry of the newly-connected party.

If a directory entry does not exist for the new user, then, in step 670, a new directory entry is created for the new user. Creation of a new directory entry involves sending entry creation command to DBMS 350 via DBC layer 340, which should be apparent to those skilled in the art upon reading the present disclosure. The new directory entry would also include a relationship list for the new user.

In step 680 of FIG. 6, the reciprocal relationship type, the name, and e-mail address of the existing user are copied to and stored in the relationship list of the new user. In this way, when the new directory entry is accessed, the name of the existing user and his relationship to the new user will be displayed.

In step 690, an e-mail message is sent by the information directory system to the new user that a new directory entry has been created from him. Preferably, the e-mail message includes an URL address of his directory entry such that it can be accessed easily. Thereafter, process 600 ends.

According to one embodiment of the present invention, the existing user may also specify whether the relationship connection is displayed for public view. If the relationship connection is specified for private viewing only, then the relationship connection will not be displayed when the directory entry is accessed by users other than the existing user and the new user. If the relationship connection is specified for public viewing, then the relationship connection will be displayed whenever the directory entry is accessed.

In furtherance of one embodiment of the present invention, process 600 may comprise an addition step of allowing the existing user to delete the connection and the corresponding reciprocal connection within a "grace period" after they are created. This feature allows users to correct erroneously created connections. For instance, in one particular embodiment, the grace period may be 24 hours, and a user will have control over both the connection that he created, and the reciprocal connection that is automatically generated in response to the creation of the connection. Once the grace period is over, however, the user will no longer have control over the reciprocal connection.

A method of and system for organizing a self-propagating information directory according to the relationships among the users has thus been disclosed. A major advantage of organizing an information directory according to the relationships among the users is that directory entries are organized in a more natural and intuitive fashion. Secondly, by organizing the information directory according to the relationships among users, the information directory becomes self-propagating. That is, the users may easily add the names and information of the people whom they know to the information directory. In this way, much effort in maintaining and updating the information in the directory is saved.

What is claimed is:

1. In a computer system, a method of organizing and adding entries to an information directory comprising the steps of:

accessing a first directory entry in said information directory, said first directory entry comprising a first relationship list comprising relationship information between a first user and a first set of other users having directory entries in said information directory, said first relationship list further comprising directory information comprising names and e-mail addresses for each of said first set of other users, said first relationship list under control of said first user wherein only said first user can delete information from said first relationship list;

adding directory information and relationship information for a second user to said first relationship list, said relationship information for said second user comprising a first relationship type characterizing a relationship of said second user to said first user;

converting said first relationship type to a reciprocal relationship type comprising a second relationship type characterizing a relationship of said first user to said second user;

determining whether said second user has a directory entry in said information directory;

creating a second directory entry in said information directory for said second user provided there is not an existing second directory entry in said information directory and otherwise modifying said existing second directory entry, wherein said second directory entry comprises a second relationship list comprising relationship information between said second user and a second set of other users having directory entries in said information directory, said second relationship list further comprising directory information comprising names and e-mail addresses for each of said second set of other users, said second relationship list under control of said second user wherein only said second user can delete information from said second relationship list;

adding directory information and relationship information for said first user to said second relationship list, said relationship information for said first user comprising said second relationship type;

converting said first directory entry to a first Web page to be viewed using a Web-browser program; and converting said second directory entry to a second Web page to be viewed using said Web-browser program, wherein said first Web page includes a first hyperlink that points to said second Web page and wherein said second Web page includes a second hyperlink that points to said first Web page.

2. A method as recited in claim 1 further comprising the step of:

receiving personal information for said second user to be displayed together with said second relationship list.

3. A method as recited in claim 1 further comprising the step of:

notifying said second user of said creating and modifying of said second directory entry.

4. A method as recited in claim 1 further comprising the step of:

displaying said relationship information for said first user and for said second user only when said relationship information is designated for public display.

5. A computer system comprising:

a bus;

a processor coupled to said bus; and a memory coupled to said bus, said memory comprising instructions for implementing a method of organizing and adding entries to an information directory, said method comprising the steps of:

accessing a first directory entry in said information directory, said first directory entry comprising a first relationship list comprising relationship information between a first user and a first set of other users having directory entries in said information directory, said first relationship list further comprising directory information comprising names and e-mail addresses for each of said first set of other users, said first relationship list under control of said first user wherein only said first user can delete information from said first relationship list;

adding directory information and relationship information for a second user to said first relationship list, said relationship information for said second user comprising a first relationship type characterizing a relationship of said second user to said first user;

converting said first relationship type to a reciprocal relationship type comprising a second relationship type characterizing a relationship of said first user to said second user;

determining whether said second user has a directory entry in said information directory;

creating a second directory entry in said information directory for said second user provided there is not an existing second directory entry in said information directory and otherwise modifying said existing second directory entry, wherein said second directory entry comprises a second relationship list comprising relationship information between said second user and a second set of other users having directory entries in said information directory, said second relationship list further comprising directory information comprising names and e-mail addresses for each of said second set of other users, said second relationship list under control of said second user wherein only said second user can delete information from said second relationship list;

adding directory information and relationship information for said first user to said second relationship list, said relationship information for said first user comprising said second relationship type;

converting said first directory entry to a first Web page to be viewed using a Web-browser program; and converting said second directory entry to a second Web page to be viewed using said Web-browser program, wherein said first Web page includes a first hyperlink that points to said second Web page and wherein said second Web page includes a second hyperlink that points to said first Web page.

6. A computer system as recited in claim 5 wherein said method further comprises the step of:

receiving personal information for said second user to be displayed together with said second relationship list.

7. A computer system as recited in claim 5 wherein said method further comprises the step of:

notifying said second user of said creating and modifying of said second directory entry.

8. A computer system as recited in claim 5 wherein said method further comprises the step of:

displaying said relationship information for said first user and for said second user only when said relationship information is designated for public display.

* * * * *